Aug. 4, 1936.   G. A. LYON   2,049,459
TIRE COVER AND SUPPORT THEREFOR
Filed April 30, 1934   5 Sheets—Sheet 1
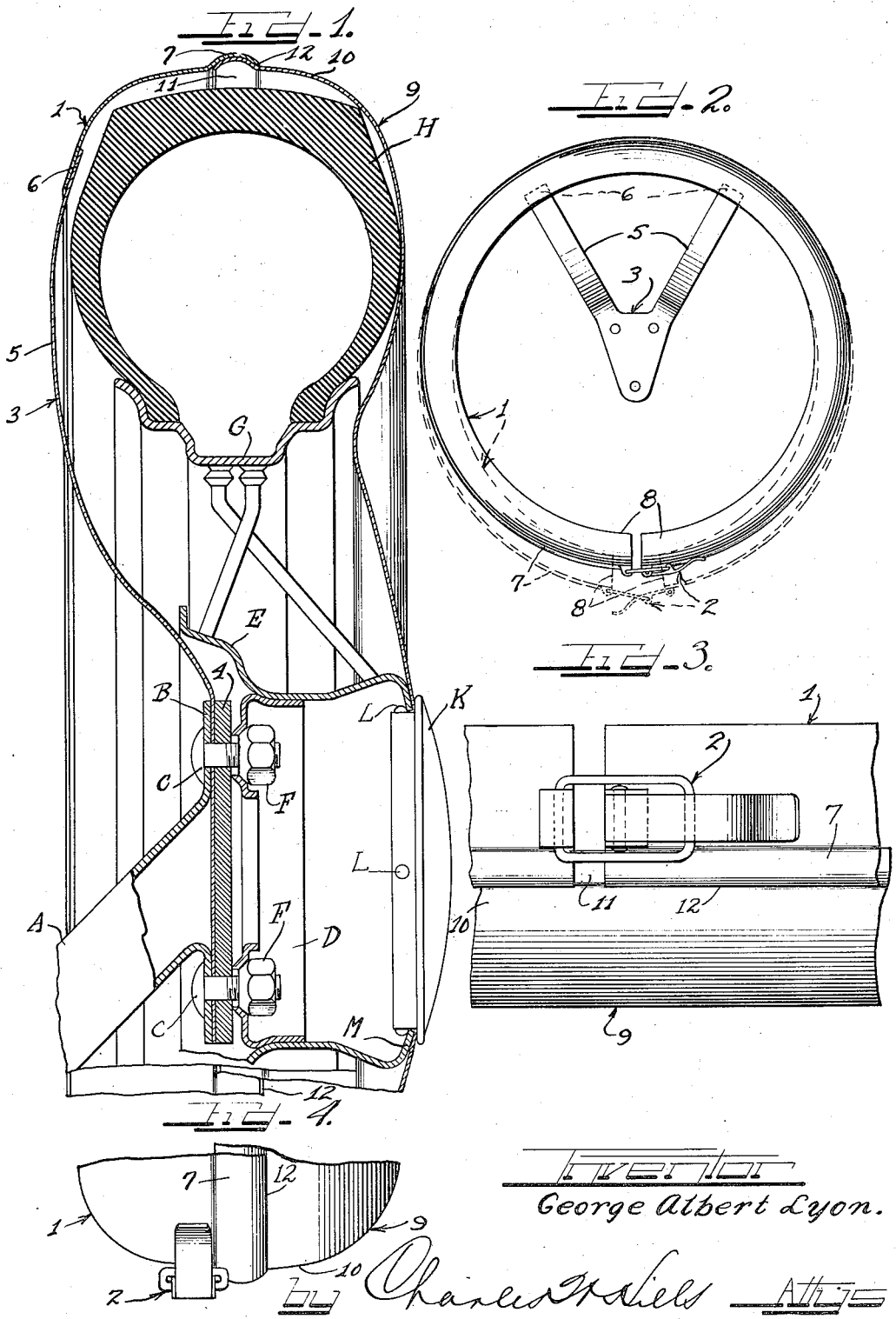
Inventor
George Albert Lyon.
by Charles H. Sells Attys

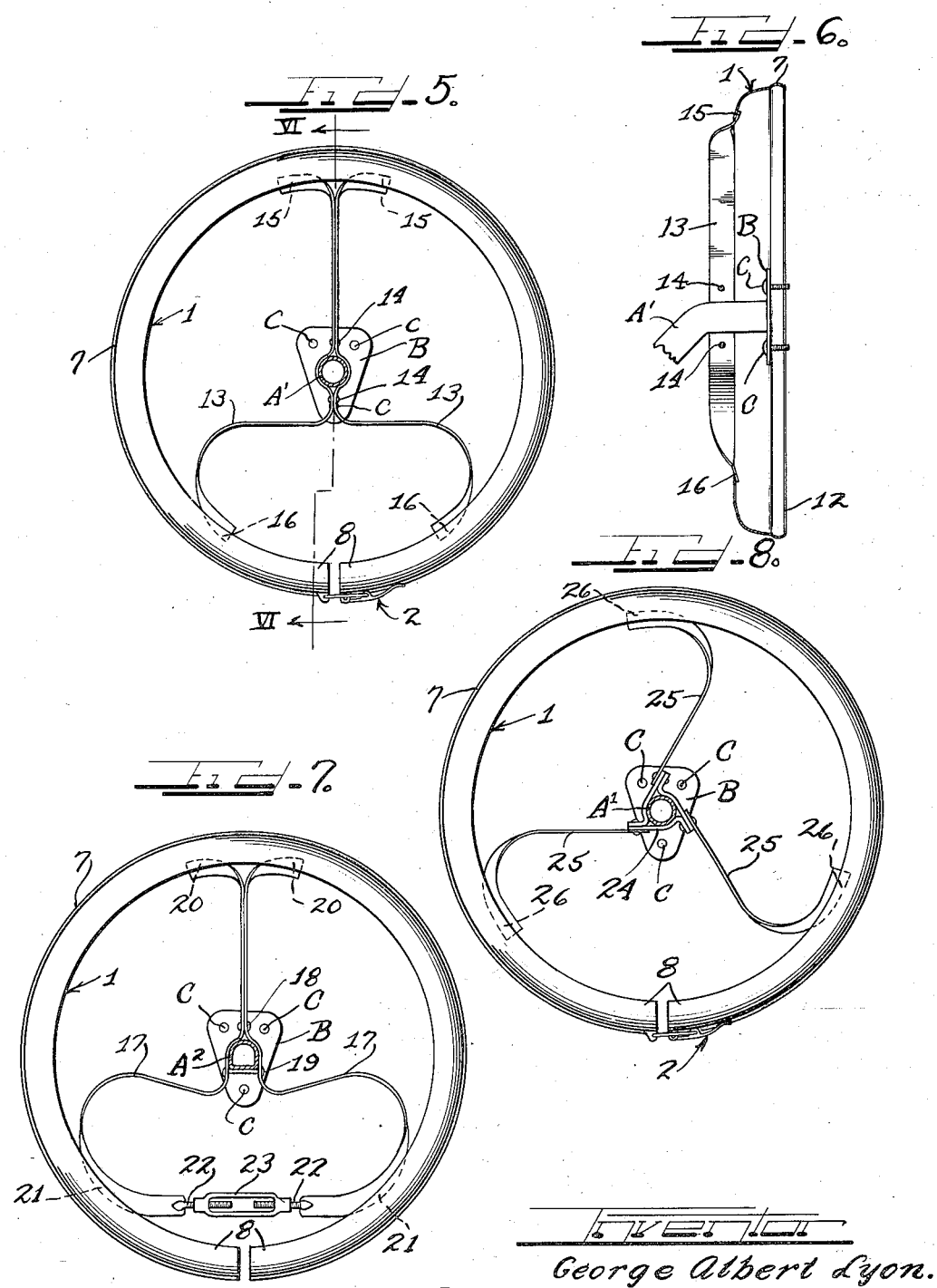

Aug. 4, 1936.     G. A. LYON     2,049,459
TIRE COVER AND SUPPORT THEREFOR
Filed April 30, 1934     5 Sheets-Sheet 3
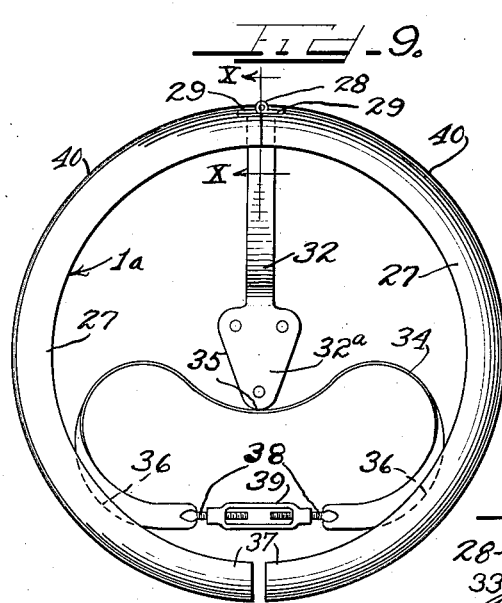
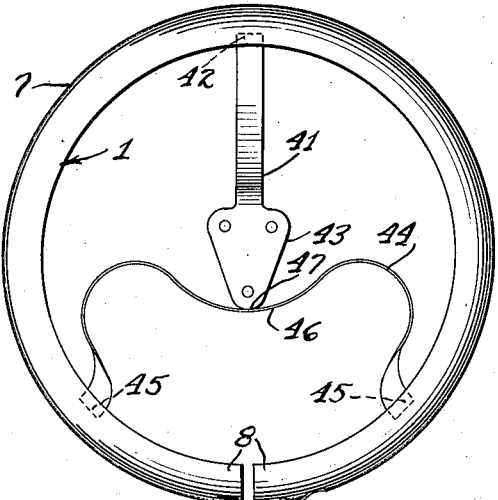
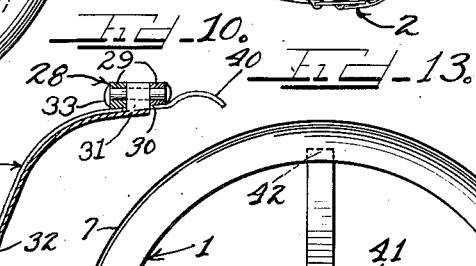
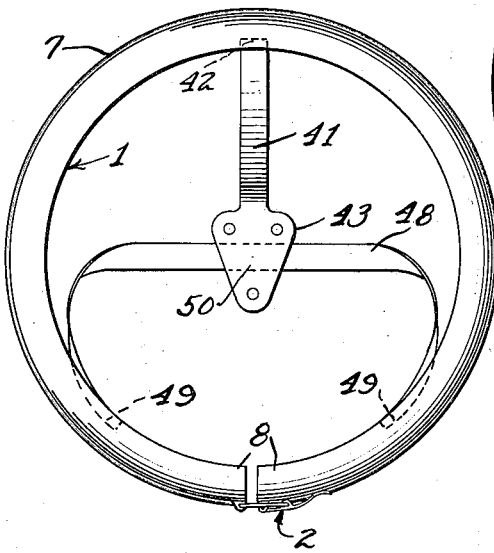
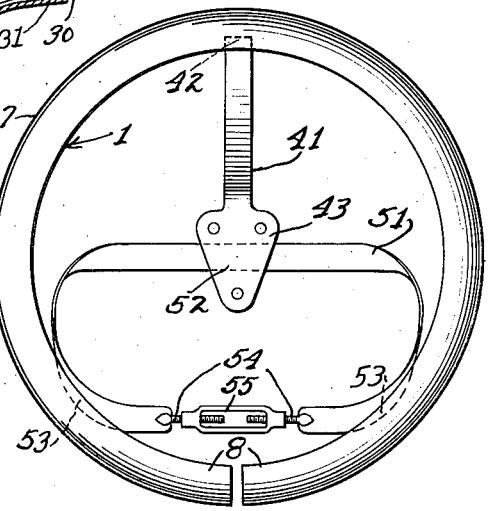
George Albert Lyon.

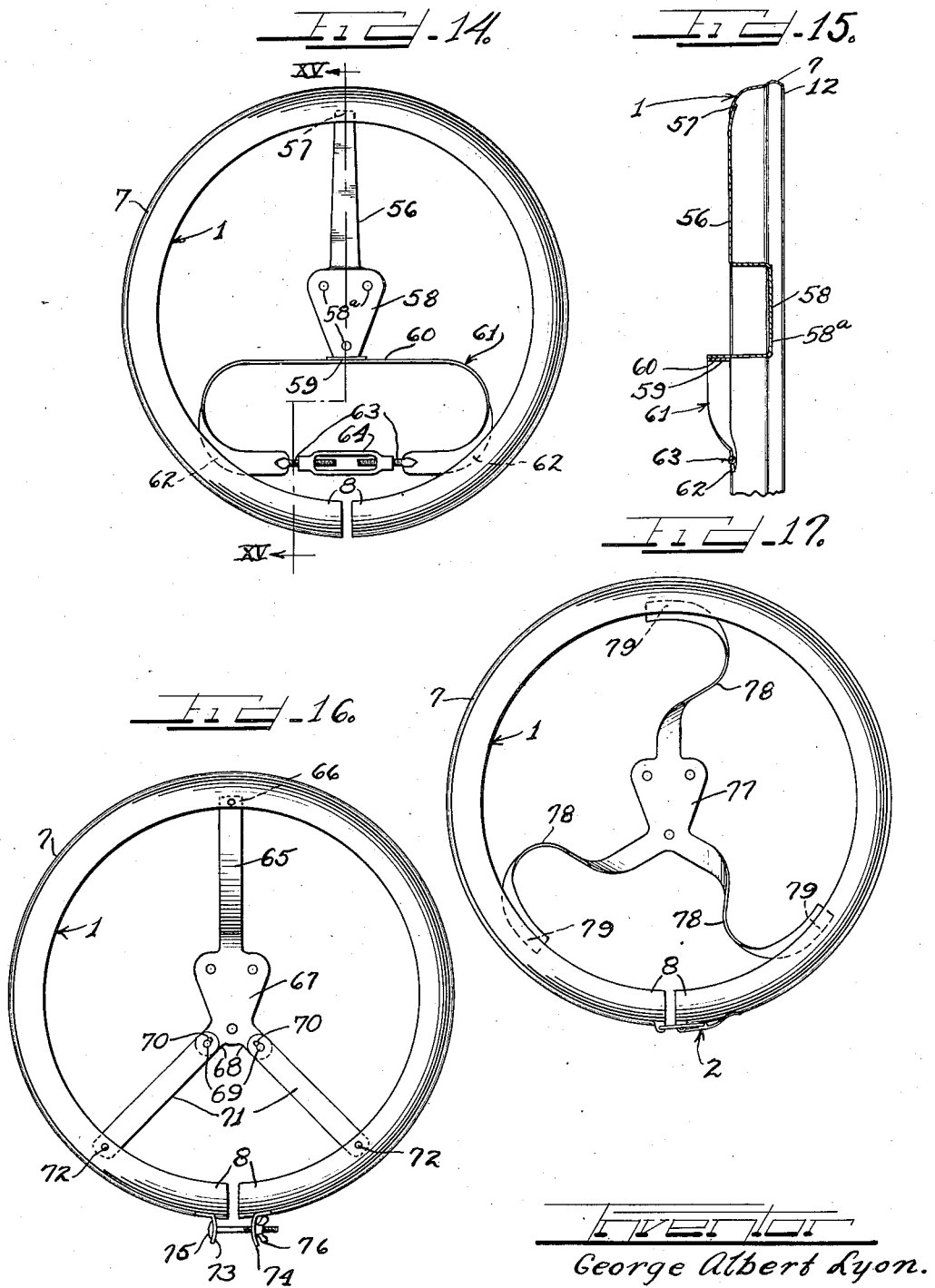

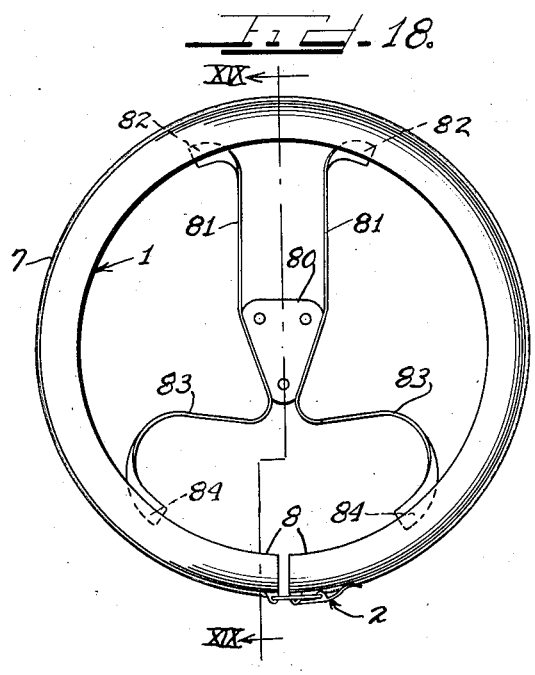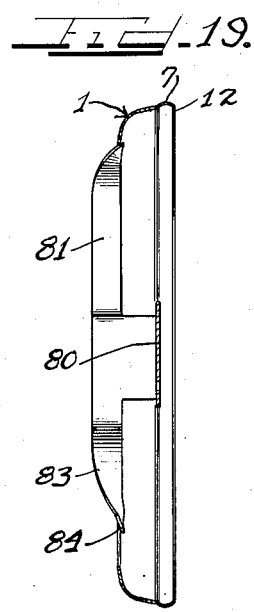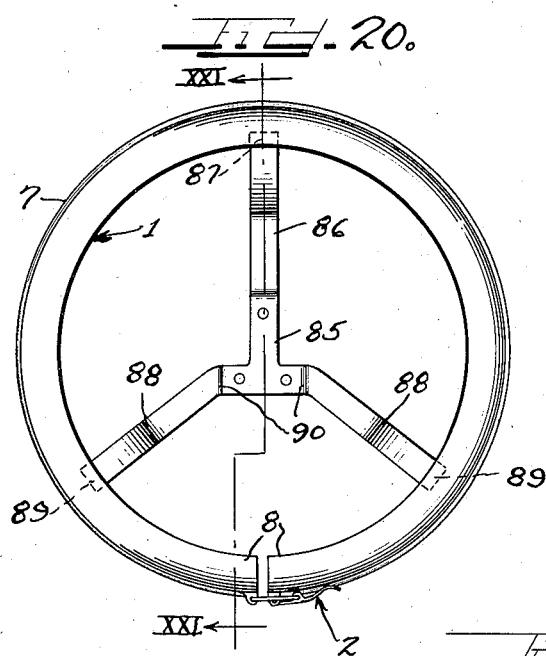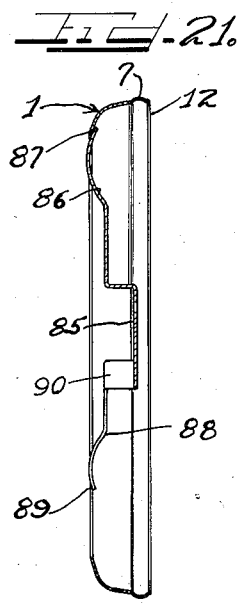

Patented Aug. 4, 1936

2,049,459

UNITED STATES PATENT OFFICE 2,049,459

TIRE COVER AND SUPPORT THEREFOR

George Albert Lyon, Detroit, Mich., assignor to Lyon Incorporated, Detroit, Mich., a corporation of Delaware Application April 30, 1934, Serial No. 723,047

20 Claims. (Cl. 150—54)

This invention has to do with tire covers and supports therefor, and is concerned more particularly with an expansible and/or contractible tire cover construction.

It is an object of the invention to provide a tire cover construction embodying means whereby the cover may be supported by the means for supporting the spare wheel and tire.

It is another object of the invention to provide a cover of this character embodying means whereby the same may be contracted to interlock with a complementary cover member and whereby the same may be allowed to expand to be released from such complementary cover member.

It is a further object of the invention to provide a tire cover member of this character which may be expanded into interlocking relation to a complementary tire cover member and may be permitted to contract itself to be released from the complementary tire cover member.

A further object of the invention resides in the provision of a tire cover which may be permanently secured to the means for supporting the spare wheel and tire, and yet embodies means whereby said cover member may be contracted and expanded, for interlocking engagement and disengagement with respect to a complementary cover member.

It is another object of the invention to provide expansible and contractible resilient covering means with additional means for augmenting the expansibility and/or contractibility of such cover means. It is a still further object of the invention to provide an expansible and contractible tire cover member with means for augmenting the expansibility and contractibility of the same, the means including positively operating instrumentalities for causing expansion and contraction of the member.

It is a further object of the invention to provide a contractible and expansible tire cover member with means for augmenting these characteristics of the member, and employ separate means for positively contracting the member.

In accordance with the general features of the invention, there is provided a front plate arranged to extend substantially from the front opening of the hub outwardly so as to cover the front of the spare wheel and tire and preferably to extend partially across the tread of the tire and provided with a marginal bead. The cover construction comprises a second cover member formed to overlie the remainder of the tread and a part of the adjacent rear side wall of the tire. This second member is provided with one or more arms rigidly secured to the spare wheel carrier, which is itself mounted on the vehicle body or chassis, said second member being split so as to be expansible and contractible and having a marginal bead arranged to overlie the bead of the first member. Means are provided to contract the second member so as to interlock its bead with that of the first member and thus support the first member on the second member. The arm or arms by which the second member is supported may be rigid, in which event the member itself is resilient, or the arms may themselves be resilient regardless whether such member is itself resilient. Such member may be made in one piece or may be made in a plurality of pieces, preferably two, hinged together. Any suitable means such as turnbuckle structure or toggle instrumentalities may be provided to contract and expand such member. Whichever contracting and expanding means is employed, the same is arranged to be readily reached and operated, and to be substantially out of sight when the cover is mounted in operative position and is viewed from the front of the cover, regardless whether the same be mounted at the rear or a side or in any other relation to the automobile.

With this construction, since the expansible and contractible member is permanently mounted on the vehicle, independently of the spare wheel and tire, and serves to support the front cover member, which front cover member is arranged to releasably receive the hub cap of the wheel, the cover construction may be mounted in its entirety independently of the spare wheel and tire and thus, regardless of the presence of the latter, may be employed to enhance the appearance of the vehicle as a whole.

In applying the front cover, it is necessary merely to place the same in substantially coaxial relation to the tire, and this condition readily obtains in view of the shape of the cover member with respect to the tire, and when the bead of the front member is within the bead of the rear member, contracting the rear member so as to interlock the beads. Then, if desired, the hub cap is positioned with its skirt passing through the opening in the front cover member and the corresponding opening in the hub to snap into the hub and hold itself in place. By releasing the contracting means, the rim portion of the front cover member may be grasped and removed.

Other objects and advantages of the invention will appear as the description proceeds.

This invention (in preferred forms) is illustrated in the drawings and hereinafter more fully described.

On the drawings:

Figure 1 is a dimetral sectional view through a spare wheel carrier, spare wheel, tire and cover construction in accordance with one form of the invention, certain parts being shown for convenience in elevation.

Figure 2 is a reduced rear elevational view of the rear cover member, together with its mounting bracket, the full lines showing said member in contracted and interlocked position, relative to the other cover member, and the dotted lines showing the rear cover member in expanded or unlocked position.

Figure 3 is an enlarged fragmentary bottom view of the toggle mechanism appearing at the bottom of Figure 2.

Figure 4 is a fragmentary enlarged side elevational view, looking from right to left, of the toggle mechanism appearing at the bottom of Figure 2.

Figure 5 is a rear elevational view of a modified form of the invention, showing the rear cover member in contracted position and the manner in which it is mounted on the spare wheel carrier.

Figure 6 is a cross-sectional view of the structure shown in Figure 5, taken substantially as designated by the line VI—VI in Figure 5, the carrier being shown for convenience in elevation.

Figures 7 and 8 are views similar to Figure 5 but showing further modified forms of the invention.

Figure 9 is a view similar to Figure 2 but showing a further modified form of the invention.

Figure 10 is an enlarged fragmentary sectional view of the hinge connection of Figure 9, taken substantially as designated by the line X—X.

Figures 11, 12, and 13 are views similar to Figure 9 but showing three additional forms of the invention.

Figure 14 is a view similar to Figure 9 but of a still further modified form of the invention.

Figure 15 is a fragmentary sectional view taken substantially as designated by the line XV—XV in Figure 14.

Figures 16 and 17 are views similar to Figure 9 but showing two additional forms of the invention.

Figure 18 is a view similar to Figure 9 but showing another form of the invention.

Figure 19 is a sectional view taken substantially as indicated by the line XIX—XIX in Figure 18.

Figure 20 is a view similar to Figure 9 but showing another modification of the invention.

Figure 21 is a sectional view taken substantially as indicated by the line XXI—XXI in Figure 20.

Referring now more particularly to the drawings, a spare wheel carrier A is flanged at B and carries mounting bolts C which are preferably permanently united to the carrier and arranged to project through openings in the attaching flange or collar D of the spare wheel hub E and to removably receive nuts F, which nuts may be also employed in the mounting of the spare wheel G in position to support the vehicle. The carrier A is conventionally a permanent part of the vehicle, being mounted at the rear or at the sides, usually, although the same may be mounted at any part of the vehicle insofar as the present invention is concerned. A spare tire H may be carried by the wheel G, and a hub cap K having any suitable interlocking means such as spring clips L may be releasably inserted into and snappingly interlocked with the front wall M of the hub E.

The tire cover construction embodying the invention in accordance with the form of the invention appearing in Figure 1 comprises a resilient split ring I arranged to extend forwardly across part of the tread of the spare tire and to extend inwardly in a generally radial direction so as to overlie the adjacent part of the rear side wall of the tire. The ring I is of such construction as to inherently try to assume an expanded condition as shown in dotted lines in Figure 2, and is provided at its ends with a toggle mechanism 2 which may be readily operated to contract the ring I to the shape shown in full lines in Figure 2 or to release the same to the shape shown in dotted lines in Figure 2, as desired.

The ring I carries a mounting bracket 3 which is preferably permanently secured to the carrier A by being sandwiched between the flange B and a retaining plate 4 and having the bolts C passing therethrough, the plate 4 being suitably united to the flange B. The bracket 3 is provided with one or more arms 5 which may be welded, brazed, riveted or otherwise suitably secured to preferably spaced upper portions of the ring I as shown at 6, the ring I being preferably made of sheet metal although the same may be made of any other suitable material having the desired self-retaining and resilient characteristics. The front marginal portion of the ring I is formed as an outwardly projecting substantially arcuate bead 7 which may be disposed in any desired relation to the tread of the tire H but is preferably arranged at substantially the median plane of the tire for the sake of symmetry. The ring I is of such size even when contracted as to afford clearance between the same and the tire H when the latter is mounted on the wheel and on the carrier A. The arms 5 are connected to the ring I in such positions as to leave the ends 8 of the ring sufficiently free to flex without interference by the bracket 3.

The front cover member 9 is preferably formed with a substantially central opening of substantially the same size as the opening in the front wall M of the wheel hub E so as to permit the skirt of the hub cap K to pass therethrough and enable the hub cap to be interlocked with said front wall, the flange of the cap K at the same time engaging the front surface of the cover member or section 9 and thus conceal the substantially central opening in said section. The cap K thus serves to removably hold the front cover section 9 in substantially coaxial relation to the wheel.

The front cover member 9 extends outwardly so as to cover the front side of the spare wheel and tire and is provided with a rim portion 10 extending rearwardly over the tread of the tire and terminating marginally in a bead 11 complemental to and formed to nest in the rear section bead 7. The front section 9 is preferably formed of any suitable sheet material such as sheet metal, fibre, hard rubber, phenolic condensation product or the like and is preferably completely circular and form-retaining. It will be understood, however, that it is not essential that the cover section 9 be completely circular or that it completely conceal the entire front of the spare wheel and tire.

When the rear ring section 1 is in its expanded condition, when it assumes the shape shown in dotted lines in Figure 2, the diameter of its front edge 12 is somewhat greater than the maximum outer diameter of the bead 11 of the section 9, so as to enable the bead 11 to be readily telescoped into nested relation to the bead 7 of the rear section 1. When this is done, the rear section will support the front section temporarily with the assistance of the person applying the same, or if desired, the hub cap K may be applied to the position shown in Figure 1, to thereby hold the front section 9 in position so as not to require attention. Thereupon the contracting means such as the toggle mechanism may be operated to contract the rear section 1 from the condition shown in dotted lines in Figure 2 to that shown in full lines in Figure 2. When this is done, the beads 7 and 11 are interlocked and thus the front cover member is securely supported in spare wheel and tire covering position.

In the event no spare wheel and tire is supported on the carrier A, it is obvious that the front cover member may be interlocked with and supported by the rear cover member in exactly the same way as above described, and the cap K may be interlocked with the front cover section 9 in the same way in which it interlocks with the hub E.

It will be observed that the toggle mechanism 2 is arranged on the ring 1 at the rear of the bead 7 and takes up but little space so as to be substantially concealed from the view of a person viewing the front side of the cover. Yet said mechanism is so arranged as to be readily accessible for operation.

In Figures 5 and 6 is shown a modified mounting for the rear cover section 1. In this form, the mounting bracket for the section 1 comprises a pair of resilient straps 13 passing about the tubular portion of a carrier A', bolted or riveted together at 14 above and below the carrier A', extending upwardly side by side and diverging at the upper part of the section 1 and individually secured to the section 1 as by welding, riveting, brazing or the like at 15. The arms or straps 13 diverge below and adjacent the lower securing means 14 therefor and together form a substantially C-shaped figure with their lower ends converging and secured in somewhat spaced relation to the ends 8 of the ring section 1 as by welding or the like at 16. The straps 13 are preferably resilient, and the substantially C-shaped structure afforded thereby is constructed so as to tend to draw apart the ends H and thus augment the expanding resilient characteristics of the section 1. At the same time, the straps 13 afford a substantially three point support for the section 1 so as to tightly hold the same on the carrier A', the connection between the straps 13 and said carrier being tight so as to inhibit relative movement between said straps and the carrier A'.

Figure 7 shows a construction somewhat different from that disclosed in Figures 5 and 6. In Figure 7, the straps 17 are arranged in a manner similar to the straps 13, being connected above and below the carrier A², which has a flat side, by rivets or other suitable means 18 and 19, and having the upper ends of the straps 17 diverging and united to the ring section 1 at 20 by welding or in any of the ways heretofore mentioned. It is to be understood that the cross-sectional form of the carrier may vary in numerous ways and that the connection therebetween and the arms or straps may be correspondingly varied, since such shape and such connections are independent of the form which the remaining portions of the straps and other structure may have. For example, if desired, the shapes of the carriers A' and A² in Figures 5 and 7 could be interchanged without departing from the principles of the invention. The shape of carrier A² is shown in Figure 7 for illustrative purposes only.

The straps 17 below the connection thereof with the carrier A² are formed similarly to the straps 13 of Figures 5 and 6 but, instead of terminating at their connections at 21 with the section 1, the arms 17 extend toward each other beyond said connections, terminating in oppositely directed screw portions 22 threaded into a turnbuckle 23. The straps 17, as in the case of the straps 13 above described, by reason of their resilience, are flexible, as is also the section 1, so that the section 1 and said arms will yield one way or the other, according as the turnbuckle 23 is turned one way or the other. The arrangement is such that the ends 8 of the section 1 may be drawn apart sufficiently to allow the sections 1 and 9 to telescope freely, and the ends 8 may be drawn toward each other to positively interlock the beads 7 and 11 on the respective sections 1 and 9. It is to be noted that the turnbuckle is near the bottom and rear part of the cover section 1 so as to be free of the sections, tire and wheel and thus be readily reached by hand or by a tool, if desired, and turned.

Figure 8 shows a construction similar to Figure 5 but with the supporting straps in a different arrangement. In this figure, the rear section supporting structure includes a built-up spider having a generally triangular form at its center as shown at 24 and carrying radiating arms 25 substantially equidistant from one another, angularly, and having their outer ends turned in the same direction and united as by welding or in any of the other ways above mentioned to the section 1 at 26. The arms 25 are perfectly resilient so as to augment the tendency of the section 1 to expand, said arms at the same time providing a three-point support for the cover section 1 from the carrier A'. The triangular portion 24 preferably tightly embraces the carrier A' so as to prevent relative movement therebetween. The contraction of the section 1 is made possible by means of the toggle mechanism 2, although any other suitable means for this purpose may be provided.

In the form of the invention shown in Figure 9, the rear cover section 1a comprises two substantially semi-circular parts 27 hinged together at 28. The hinge construction embodies hinge wings 29 connected to the respective parts 27 with their eyes axially spaced and with their axes at substantially right angles to the plane of the section 1a. The parts 27 at the hinge 28 are slotted to provide an opening 30 through which an eye 31 carried by a supporting arm 32 projects so as to be aligned with the wing eyes. A hinge pin 33 passes through the respective eyes so as to be interlocked therewith and yet enable the parts 27 to swing relative to each other and to the supporting arm or strap 32.

The strap 32 may have an integral inner end portion 32a provided with suitable openings to enable the same to be fastened to the flange B of the spare wheel carrier in much the same manner in which the strap member 3 of Figures 1 and 2 is mounted.

Additional supporting means for the cover member 1a is provided in the form of a separate strap 34 of generally C-shape with its bight upward and bearing against the lower end of the strap mounting portion 32a. The bearing portion of the part 32a is preferably arranged intermediate the longitudinal edges of the strap 34, and the strap 34 is welded at 36 or secured in any other suitable manner as above described to the parts 27 adjacent their free ends 37. From its points of connection with the parts 27, the strap 34 extends inwardly to terminate in screw elements 38 threadedly receiving a turnbuckle 39. The strap 34 bears resiliently at 35 against the mounting portion 32a of the first mentioned strap member 32, and the strap 34 is flexible and affords with the strap member 32 a substantially three-point support for the cover member 1a. The flexibility of the strap 34 enables the turnbuckle 39 to spread apart or draw together the ends 37, causing the parts 27 to pivot about the hinge connection 28.

The cover member 1a is also provided with a bead 40 having the same function as the bead 7 of Figure 1.

In the form of the invention illustrated in Figure 11, a mounting strap 41 similar to the strap 32 of Figure 9 is provided. The strap 41 has its upper end welded at 42 or secured in any other suitable manner heretofore described to the middle of the resilient split ring section 1 and has a mounting or head portion 43 provided with openings whereby the same may be secured to the flange B of the spare wheel carrier in much the same manner in which the strap 3 of Figures 1 and 2 is mounted. A substantially C-shaped resilient strap 44 is arranged so that its ends are welded or otherwise suitably secured to the ring section 1 in spaced relation to the ends 8 as at 45, the bight 46 of the strap 44 being resiliently engaged with the lower part of the attaching portion 43 of the strap 41 as at 47, the portion 43 being disposed substantially intermediate the longitudinal edges of the bight 46. The strap 44 serves to augment the expansive tendency of the ring section 1, and the toggle mechanism 2 is provided in order to contract the section 1. If it is found desirable, suitable retaining means may be employed to prevent complete separation of the parts having bearing contact at 35 in Figure 9 and at 47 in Figure 11.

Figure 12 shows a construction similar to that appearing in Figure 11, differing therefrom substantially in that the substantially C-shaped strap 48 is arranged forwardly of the head 43 of the strap 41 so as to be secured between such head and the retaining plate 4, illustrated in Figure 1. The end portions of the strap 48 extend downwardly and terminate in somewhat spaced relation to the ends 8 of the section 1, said ends being connected to the section 1 at 49 as by welding, or in any other suitable manner such as one of those above described. The strap 48 is flexible and cooperates with the section 1 so as to tend to hold the same in expanded condition. The strap 48 may, if desired, be secured to the head 43 as at 50 if desired, as by spot welding or any other suitable means.

Figure 13 shows a construction which combines certain features of the forms illustrated in Figures 9 and 12. In Figure 13, the section 1 is provided with the mounting strap 41 welded or otherwise secured at 42 to the upper part of the ring section 1 and having a head for attachment to the spare wheel carrier as shown at 43. A substantially C-shaped strap 51 has its bight extending substantially vertically as is true of the bight of the strap 48 in Figure 12 and passing in front of the head 43 for securement preferably in the manner above described with respect to the strap 48. Said strap 51 may, if desired, be secured to the head 43 as at 52 by welding or other suitable means and from said bight extends downwardly to be secured as by welding or other suitable means at 53 to portions of the section 1 somewhat spaced from the ends 8 of said section. From the points of connection 53, the ends of the strap 51 extend toward each other and terminate in oppositely threaded screw portions 54 threadedly received by a turnbuckle 55.

Figure 14 shows a further modified form of the invention, wherein the section 1 is provided with a strap 56 whose upper end is welded at 57 or otherwise suitably secured to the section 1 and whose lower end is bent in the form of a U whose bight 58 is provided with bolt holes for attachment in the same manner in which the bracket 3 of Figures 1 and 2 is mounted on the spare wheel carrier. The lower arm of the U-shaped portion extends rearwardly and is welded at 59 or otherwise suitably secured to the upper horizontally flat bight portion 60 of a resilient strap 61. The strap 61 on opposite sides of its bight 60 extends downwardly to be fastened by welding or in any other suitable way at 62 in spaced relation to the ends 8 of the section 1, the ends of the strap 61 extending toward each other from said points of connection and terminating in oppositely directed screw portions 63 threadedly received by a turnbuckle 64. The strap 61 is resilient and cooperates with the section 1 in a manner hereinabove specified.

Figure 16 shows another modification wherein the section 1 carries a vertically extending strap or bracket arm 65 welded or otherwise suitably secured at its upper end to the section 1 as at 66 and having its lower end formed as a head 67 having openings by means of which the head may be mounted on the spare wheel carrier as above described. The lower part of the head 67 is provided with ears 68 carrying pivot pins 69 passing through slots 70 at the upper ends of links 71 which diverge downwardly and are pivotally connected at their lower ends to the section 1 in somewhat spaced relation to the ends 8 thereof as shown at 72. The resilience of the section 1 tends to cause the ends 8 thereof to move apart from the relation shown in Figure 16, and the pin and slot pivotal connections between the links 71 and the strap head 67 make it possible for said ends to approach and recede from each other. The links 71 and strap 65 thereby provide a substantially three-point support for the section 1 to hold the ends against substantial movement transversely to the plane of the section 1. The bottoms of the ends 8 carry brackets 73 and 74, respectively, for receiving a bolt and thumb nut 75 and 76, the bracket 74 being preferably forked to permit the threaded end of the bolt 75 to be swung into and out of cooperative relation thereto. The bracket 74 is however preferably curved downwardly and outwardly so as to prevent the threaded end of the bolt and the nut 76 from slipping away from said bracket when it is desired to hold the ends 8 adjacent each other. It will be understood that the tightening means just described may be replaced by the toggle or turnbuckle mechanism illustrated in connection with other forms of the invention.

In the form of the invention appearing in Figure 17, the split ring section 1 has a three-point support in the form of a spider whose body 77 is provided with openings to receive the mounting bolts for supporting the same on the spare wheel carrier as shown in Figure 1. The arms 78 of the spider are integral with the body 77 and extend toward and are then curved into substantial tangency with the section 1 and welded or otherwise suitably secured thereto as at 79. The arms 78 are flexible so as to give when the section 1 expands by its own resilience and when the same is contracted by means of the toggle mechanism 2 or other suitable means for that purpose.

Another form of the invention is shown in Figures 18 and 19, wherein the split ring section 1 is provided with a supporting spider whose head 80 is formed so as to be secured to the spare wheel carrier in substantially the same manner in which the attaching bracket 3 of Figures 1 and 2 is secured in position. The spider is provided with a plurality of arms 81 extending upwardly in spaced relation to each other and welded at 82 or otherwise suitably secured to the upper part of the ring 1. The spider is provided with lower arms 83 also integrally connected with the head 80 and together providing a substantially C-shaped structure opening downwardly and connected at its ends as by welding or the like at 84 to the lower part of the section 1 in spaced relation to the ends 8 of the section. Arms 81 and 83 are preferably resilient, the arms 83 also preferably augmenting the tendency of the section 1 to expand from the contracted condition shown in Figure 18. Any suitable means such as the toggle mechanism 2 may be employed for contracting the section 1 and holding the same in contracted condition as shown in Figure 18.

Another modification of the invention is shown in Figures 20 and 21, in which the split ring section 1 is provided with a one-piece spider having a substantially T-shaped head 85 provided with bolt openings for enabling the same to be mounted on a spare wheel carrier in a manner similar to the mounting of the bracket 3 in Figure 1, the arrangement of the openings on the head 85 being however reversed. The spider of Figures 20 and 21 is provided with an upwardly extending arm 86 welded at 87 or otherwise suitably secured to the upper part of the section 1. A pair of arms 88, extending from the respective ends of the cross bar of the head 85, downwardly and laterally, have their lower ends welded at 89 or otherwise suitably secured to the section 1 in substantially spaced relation to the ends 8 of the section. All three arms 86 and 88 are in substantially the plane of the rear margin of the section 1, and the head 85 is offset forwardly as is the head 80 in Figures 18 and 19 for cooperation with the spare wheel carrier. The bends at 90 and the resilience of the material of which the spider is made, enables the arms 88 to flex at said bends in response to the expansive and contractive movement of the ends 8 of the section 1, the toggle mechanism 2 being employed to contract the section. Accordingly it is evident that the spider structure affords a means for adequately supporting the section 1 from the spare wheel carrier, and at the same time intensifies the resilience of the section 1, said spider construction being of such resilient characteristics as to flex in response to expansion and contraction of the section 1.

It will be appreciated that the toggle mechanism of Figures 18 and 20 may be replaced by any other suitable mechanism for contracting the section and enabling the section to expand.

When the section 1 or 1a, as the case may be, is expanded, the front section 9 may be allowed to be held in place by the hub cap K. In the absence of the hub cap K, the front section 1 will be supported by the lower part of the rear section 1 or 1a, and will either gravitate forwardly and swing downwardly off the rear section, or may be bodily swung forwardly and removed by hand. Thus the rear section 1, by manipulating the toggle or other suitable mechanism, may be allowed to expand without necessitating a division of the operator's attention to support the front section.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a device for covering a spare tire on a spare wheel adapted to be mounted on a spare wheel carrier, a flexible ring member for covering a peripheral part of the tire, means carried by said ring member for attachment to the carrier, said member being flexible in different directions relative to said means, a second cover member formed to cover an adjacent tread part of the tire, and connecting means associated with said members and arranged to be interlocked when said ring member is flexed in one direction and released when said ring member is flexed in another direction.

2. In a device for covering a spare tire on a spare wheel adapted to be mounted on a spare wheel carrier, a flexible ring member for covering a peripheral part of the tire, means carried by said ring member for attachment to the carrier, said member being flexible in different directions relative to said means, a second cover member formed to cover an adjacent peripheral part of the tire, and connecting means associated with said members and comprising male and female parts arranged to be interlocked when said ring member is flexed in one direction and released when said ring member is flexed in another direction, said female part comprising a substantially annular bead disposed in substantially the median plane of the tire when the device is in proper covering position.

3. In a device for covering a spare tire on a spare wheel adapted to be mounted on a spare wheel carrier, a flexible ring member for covering a peripheral part of the tire, a second cover member formed to cover an adjacent tread part of the tire, resilient means yieldably attaching one of said members to the carrier, and connecting means associated with said members and arranged to be interlocked when said ring member is flexed in one direction and released when said ring member is flexed in another direction.

4. In a device for covering a spare tire on a spare wheel adapted to be mounted on a spare wheel carrier, a flexible ring member for covering a peripheral part of the tire, a second cover member formed to cover an adjacent tread part of the tire, resilient means yieldably attaching one of said members to the carrier, and connecting means associated with said members and arranged to be interlocked when said ring member is flexed in one direction and released when said ring member is flexed in another direction, said attaching means being secured substantially equidistantly circumferentially to at least three parts of said one member to afford substantially uniform support therefor.

5. In a device for covering a spare tire on a spare wheel adapted to be mounted on a spare wheel carrier, a flexible ring member for covering a peripheral part of the tire, means carried by said ring member for attachment to the carrier, said member being flexible in different directions relative to said means, a second cover member formed to cover an adjacent tread part of the tire, and connecting means associated with said members and arranged to be interlocked when said ring member is flexed in one direction and released when said ring member is flexed in another direction, said ring member being inherently springable in one of said directions, and means for flexing said ring member in the other of said directions.

6. In a device for covering a spare tire on a spare wheel adapted to be mounted on a spare wheel carrier, a flexible ring member for covering a peripheral part of the tire, means carried by said ring member for attachment to the carrier, said member being flexible in different directions relative to said means, a second cover member formed to cover an adjacent tread part of the tire, and connecting means associated with said members and arranged to be interlocked when said ring member is flexed in one direction and released when said ring member is flexed in another direction, said ring member being inherently springable in one of said directions, and means for flexing said ring member in the other of said directions, the last mentioned means being operative in response to the tendency of said ring member to spring, to resist springing of said ring member.

7. In a device for covering a spare tire on a spare wheel adapted to be mounted on a spare wheel carrier, a split flexible ring member for covering a peripheral part of the tire, means connected with the ends of said member for flexing it, means carried by said ring member for attachment to the carrier, said member being flexible in different directions relative to said means, a second cover member formed to cover an adjacent tread part of the tire, and connecting means associated with said members and arranged to be interlocked when said ring member is flexed in one direction and released when said ring member is flexed in another direction.

8. In a device for covering a spare tire on a spare wheel adapted to be mounted on a spare wheel carrier, a split flexible ring member for covering a peripheral part of the tire, means spaced from the ends of said member for flexing it, means carried by said ring member for attachment to the carrier, said member being flexible in different directions relative to said means, a second cover member formed to cover an adjacent peripheral part of the tire, and connecting means associated with said members and arranged to be interlocked when said ring member is flexed in one direction and released when said ring member is flexed in another direction.

9. In a device for covering a spare tire on a spare wheel adapted to be mounted on a spare wheel carrier of an automobile, a pair of substantially semi-circular parts hinged together in circular shape and formed to cover a peripheral part of the tire, means carried by said parts for attachment to the carrier, said means being resilient and form-retaining so as to normally hold said ring member in one condition of flexure, and means for overcoming the resistance offered by said attaching means to flex said ring member.

10. In a device for covering a spare tire on a spare wheel adapted to be mounted on a spare wheel carrier of an automobile, a pair of substantially semi-circular parts hinged together in circular shape and formed to cover a peripheral part of the tire, means carried by said parts for attachment to the carrier, said means being resilient and form-retaining so as to normally hold said ring member in one condition of flexure, and means for overcoming the resistance offered by said attaching means to flex said ring member, said attaching means being hinged to said parts so as to enable both of said parts to swing relative to said attaching means.

11. In a device for covering a spare tire on a spare wheel adapted to be mounted on a spare wheel carrier of an automobile, a pair of substantially semi-circular parts hinged together in circular shape and formed to cover a peripheral part of the tire, means carried by said parts for attachment to the carrier, said means being resilient and form-retaining so as to normally hold said ring member in one condition of flexure, means for overcoming the resistance offered by said attaching means to flex said ring member, and means forming with said attaching means a substantially three-point support for the ring member, said last mentioned means comprising a substantially C-shaped resilient member connected to spaced portions of said ring member and having its bight sprung against said attaching means.

12. In a device for covering a spare tire adapted to be mounted on an automobile spare wheel carrier, an expansible and contractible resilient split ring member for covering a peripheral part of the tire, means for supporting said ring member from the carrier, said member being flexible in different directions relative to said means, a second cover member formed to cover a tread part of the tire, connecting means associated with said members and arranged to have free telescopic movement relative to each other when said ring member is in one condition of flexure, and to be interlocked when said ring member is in another condition of flexure.

13. Tire cover construction comprising a member formed to cover a part of a spare tire, means associated with said member for attaching the same to a vehicle, a member formed to cover a tread part of the tire, and means for interlocking said members so as to support the second member from the first member, the first member being expansible and contractible and said attaching means being flexible but form-retaining so as not to interfere with the expansion and contraction of the first member and yet properly support the first member from the vehicle.

14. In an assembly including a spare wheel carrier mounted on an automobile, a spare tire cover comprising a substantially circular member formed to surround the tread of the spare tire, means whereby said member is attached to the carrier, said member being expansible and contractible whereby the same may be interlocked with a cover member for another part of the tread of the tire, a cover member for another part of the tread of the tire, and means for supporting the second member from the wheel in position to be interlocked with the first member pending interlocking of said members.

15. In a device for covering a spare tire on a spare wheel adapted to be mounted on a spare wheel carrier, a flexible ring member for covering a peripheral part of the tire, means carried by said ring member for attachment to the carrier, a second cover member formed to cover an adjacent tread part of the tire, and connecting means associated with said members and arranged to be interlocked when said ring member is flexed in one direction and released when said ring member is flexed in another direction, said attaching means comprising a substantially central body portion for cooperating with the carrier and having a plurality of substantially form-retaining sections secured to circumferentially spaced portions of said ring member, said attaching means being flexible so as not to interfere with the flexing of said ring member.

16. In a device for covering a spare tire on a spare wheel adapted to be mounted on a spare wheel carrier, a flexible ring member for covering a peripheral part of the tire, means carried by said ring member for attachment to the carrier, a second cover member formed to cover an adjacent peripheral part of the tire, and connecting means associated with said members and arranged to be interlocked when said ring member is flexed in one direction and released when said ring member is flexed in another direction, said attaching means comprising a substantially central body portion for cooperating with the carrier and having a plurality of substantially form-retaining sections secured to circumferentially spaced portions of said ring member, said attaching means being flexible so as not to interfere with the flexing of said ring member, and means connected to said attaching means for expanding and contracting said ring member.

17. In a device for covering a spare tire on a spare wheel adapted to be mounted on a spare wheel carrier, a flexible ring member for covering a peripheral part of the tire, means carried by said ring member for attachment to the carrier, a second cover member formed to cover an adjacent peripheral part of the tire, and connecting means associated with said members and arranged to be interlocked when said ring member is flexed in one direction and released when said ring member is flexed in another direction, said ring member comprising a split band having its ends normally spaced apart, and means spaced from said ends and connected to said ring member for drawing said ends toward each other to contract the ring member and for drawing said ends away from each other to expand said ring member, the last mentioned means being connected to and operating through said attaching means.

18. In a tire cover, a flexible tread covering arcuate band more than 180° in extent, means for disposition at one side of the median plane of the tire, said band and means being connected together at spaced points, said means including a plurality of parts joined by lost motion connection means so as not to interfere with the flexing of said band.

19. In a tire cover, a flexible tread covering arcuate band more than 180° in circumferential extent, means for disposition at one side of the median plane of the tire and connected to said band at spaced points, said means including a plurality of connected parts relatively movable so as not to interefere with the flexing of said band.

20. In a tire cover, a flexible tread covering arcuate band more than 180° in circumferential extent, means for disposition at the rear side of the tire and connected to said band at spaced points, said means including a plurality of connected parts relatively movable so as not to interfere with the flexing of said band.

GEORGE ALBERT LYON.